(12) United States Patent
Glaser (10) Patent No.: US 11,377,278 B2
(45) Date of Patent: Jul. 5, 2022

(54) PRINTED SHEET FOR THERMOFORMED PACKAGING

(71) Applicant: Bemis Company, Inc., Neenah, WI (US)

(72) Inventor: Kevin D. Glaser, Appleton, WI (US)

(73) Assignee: Bemis Company, Inc., Neenah, WI (US)

( * ) Notice: Subject to any disclaimer, the term of this patent is extended or adjusted under 35 U.S.C. 154(b) by 71 days.

(21) Appl. No.: 16/980,258

(22) PCT Filed: Aug. 30, 2018

(86) PCT No.: PCT/US2018/048792
§ 371 (c)(1),
(2) Date: Sep. 11, 2020

(87) PCT Pub. No.: WO2019/177658
PCT Pub. Date: Sep. 19, 2019

(65) Prior Publication Data
US 2021/0032000 A1    Feb. 4, 2021

Related U.S. Application Data

(60) Provisional application No. 62/641,735, filed on Mar. 12, 2018.

(51) Int. Cl.
| | | |
|---|---|---|
| *B32B 27/32* | (2006.01) | |
| *B65D 65/40* | (2006.01) | |
| *B32B 27/08* | (2006.01) | |
| *B32B 27/30* | (2006.01) | |
| *B65D 65/42* | (2006.01) | |

(52) U.S. Cl.
CPC .............. *B65D 65/40* (2013.01); *B32B 27/08* (2013.01); *B32B 27/306* (2013.01); *B32B 27/32* (2013.01); *B65D 65/42* (2013.01); *B32B 2307/4023* (2013.01); *B32B 2307/41* (2013.01); *B32B 2307/7244* (2013.01); *B32B 2307/738* (2013.01); *B32B 2307/75* (2013.01); *B32B 2553/00* (2013.01)

(58) Field of Classification Search
CPC ..... B32B 15/085; B32B 1/02; B32B 2250/05; B32B 2270/00; B32B 2307/4023; B32B 2307/41; B32B 2307/412; B32B 2307/414; B32B 2307/7242; B32B 2307/7244; B32B 2307/7246; B32B 2307/732; B32B 2307/738; B32B 2307/75; B32B 2439/70; B32B 2439/80; B32B 2553/00; B32B 27/08; B32B 27/10; B32B 27/16; B32B 27/302; B32B 27/304; B32B 27/306; B32B 27/308; B32B 27/32; B32B 27/325; B32B 27/34; B32B 27/36; B32B 3/06; B32B 7/12; B65D 1/28; B65D 65/40; B65D 65/42
See application file for complete search history.

(56) References Cited

U.S. PATENT DOCUMENTS

| | | |
|---|---|---|
| 3,360,119 A | 12/1967 | Mullinix |
| 4,647,509 A | 3/1987 | Wallace et al. |
| 5,972,447 A | 10/1999 | Hata et al. |
| 2005/0136202 A1 | 6/2005 | Kendig et al. |
| 2007/0259142 A1 | 11/2007 | Lischefski et al. |
| 2008/0053608 A1 | 3/2008 | Wald et al. |
| 2011/0104342 A1 | 5/2011 | Glaser et al. |
| 2013/0065071 A1 | 3/2013 | Bonavoglia et al. |
| 2018/0009573 A1 | 1/2018 | Glaser et al. |

FOREIGN PATENT DOCUMENTS

| | | |
|---|---|---|
| EP | 1724105 A1 | 11/2006 |
| GB | 2329607 A | 3/1999 |
| WO | 9308018 A1 | 4/1993 |

*Primary Examiner* — Lawrence D Ferguson (57) ABSTRACT

A thermoformed packaging unit is produced from a thermoformable sheet that has a printed pigment deposit located generally in a central position between the first and second rigid components. The packaging unit has only a low level of pigment distortion even when thermoformed to a draw ratio greater than 4.

17 Claims, 4 Drawing Sheets

PRINTED SHEET FOR THERMOFORMED PACKAGING

TECHNICAL FIELD

The current application relates to printed thermoformable sheets and rigid thermoformed packaging units made therefrom.

BACKGROUND

Rigid thermoformed containers are often used as packaging units for consumer, industrial or medical products. These packages may require decoration for a number of purposes including marketing graphics, user instruction, brand coloring, vision obstruction, light blocking, etc. The procedures used today for marking rigid thermoformed containers have drawbacks.

Consumer focused marketing graphics are often applied to a thermoformed packaging container by way of an adhesive label adhered to the exterior of the container. These labels can have high end graphics and finishes, but suffer from high cost and complexity. A label requires a base piece (i.e. label stock) and adhesive for application to the container, both of which are otherwise unnecessary for the package function. It can be logistically difficult to apply the labels to a container, which is usually done via in-mold labeling or after forming.

Alternatively, graphics can be printed directly on the exterior surface of a rigid thermoformable sheet before it is thermoformed into a rigid container. Printing on a thick sheet can be a very slow process, as many printing processes are designed for thin webs. Printing on thick sheet can also be done by off-set printing. The graphics can be pre-distorted to account for the movement and stretching of the graphics through the thermoforming process. The distortion of graphics as a result of thermoforming can vary, and the prediction is often flawed, resulting in a part that is inconsistently printed. Additionally, it has been found that printed ink on the exterior of the sheet is highly susceptible fading (due to stretching) and scuffing. Even inks that are more abuse resistant tend to scuff after forming.

Printing can be applied to the exterior surface of a rigid article after forming via processes such as stamping or ink jet. Printing in this manner can be complicated and slow. Again, ink printed on the exterior surface of a formed part may be subject to abuse and have compromised appearance. Surface printed items may require a special overlacquer to protect the ink.

It has been suggested to produce a multilayer thermoformable film with an internal printed image (EP1724105, Kaschel et al; U.S. Pat. No. 5,366,791, Carr et al; GB2329607, Mundie). However, these techniques can still produce poor quality products, as the printing becomes non-uniform upon forming into deep draw or critical draw applications. Improvements are still needed to produce high quality printed thermoformed packaging.

As an alternative to printing, the thermoformable sheet can be pigmented within the polymer layers. This is often done to produce colored parts or parts that require light blocking. Using this technique, it is only possible to achieve 100% coverage or machine direction stripes (no complex patterns or indicia) and it can still suffer from fading type appearances in areas that are formed thin, such as sidewalls of cups. This technique also suffers from inefficiency as the pigment is mixed throughout the sheet and may require a high dosing level.

SUMMARY

Thermoformed packaging units can be used for packaging a wide variety of products including, but not restricted to food, cosmetics, lotions, lawn care products, cleaners/soaps, concentrates, industrial materials, pharmaceuticals, medical supplies and medical devices. These thermoformed packaging units often suffer from inconsistency and poor appearance when printing or pigmenting is added prior to forming. Resulting parts may have distortion defects due to thinning of pigment. Graphics may be susceptible to damage if they are located on the surface of the thermoformed component. The process of adding high quality graphics after forming can add complexity and cost to the packaging components.

This disclosure relates to thermoformable sheets that contain pigment deposits, i.e. are printed, that can be thermoformed into packaging components such as trays or cups. The present disclosure also relates to thermoformable sheets that may have a relatively thin multilayer film upon which the pigment is deposited. The pigment deposit is subsequently located between two relatively thick rigid components to form the thermoformable sheets. Additionally, the disclosure is related to packaging components thermoformed from the thermoformable sheets.

In summary, disclosed herein are thermoformed packaging units formed from thermoformable sheets. The thermoformable sheets comprise a first rigid component with a thickness of at least 6 mil, a second rigid component with a thickness of at least 6 mil, and a printed pigment deposit located between the first and second rigid components. The packaging units described herein have a draw ratio greater than 4.

Further, some thermoformed packaging units described herein are formed from a thermoformable sheet comprising a multilayer film, a printed pigment deposit, a first rigid component with a thickness of at least 6 mil and a second rigid component with a thickness of at least 6 mil. The multilayer film has at least a first surface layer, a second surface layer, and a first barrier layer. The pigment deposit is located directly adjacent to the second surface layer of the multilayer film, and the multilayer film is located between the first and second rigid components and the packaging unit has a draw ratio greater than 4.

The multilayer film may have a second barrier layer separated from the first barrier layer. The multilayer film may have a thickness of less than 5 mil. The multilayer film may have a thickness between 1 mil and 5 mil. The multilayer film may have a second pigment deposit adjacent to the first surface layer of the multilayer film.

The second surface layer of the multilayer film may comprise a polyolefin and that polyolefin may be an ethylene vinyl acetate copolymer.

The first rigid component may comprise a polystyrene, a polyester, a polypropylene, or blends thereof and the second rigid component may comprise a polystyrene, a polyester, a polypropylene or blends thereof. Both the first and second rigid component may have a thickness from 10 mil to 40 mil. The ratio of the thickness of the first rigid component to the thickness of the second rigid component may be between 1:2 and 2:1.

The thermoformable sheet thickness may be greater than 35 mil.

Also described herein is a specific thermoformable sheet comprising a first rigid component comprising a first styrenic polymer, a multilayer film comprising 1) a first surface layer adjacent to the first rigid component, 2) a barrier layer comprising ethylene vinyl alcohol copolymer, and 3) a second surface layer, a printed pigment deposit directly adjacent to the second surface layer of the multilayer film, and a second rigid component comprising a second styrenic polymer. The second rigid component may be directly adjacent to the printed pigment deposit. Both the first and second rigid component may be greater than 6 mil thickness. The printed pigment deposit may extend over essentially the entire second surface layer of the multilayer film. The thermoformable sheet may be opaque. Either the first or second rigid component may further comprise a pigment.

The thermoformable packaging sheet may have a multilayer film that further has a second barrier layer that includes ethylene vinyl alcohol copolymer, and four inner layers each including high density polyethylene.

The thermoformed packaging units may have a draw ratio greater than 4. The draw ratio may be between 4 and 7.

BRIEF DESCRIPTION OF THE DRAWINGS

The disclosure may be more completely understood in consideration of the following detailed description of various embodiments of the disclosure in connection with the accompanying drawings, in which.

The figures are not necessarily to scale. Like numbers used in the figures refer to like components. It will be understood, however, that the use of a number to refer to a component in a given figure is not intended to limit the component in another figure labeled with the same number.

DETAILED DESCRIPTION

Thermoformed packaging units, such as cups or trays, often suffer from inconsistency and poor appearance when printing or pigmenting is added. The process of adding high quality graphics can add complexity and cost to the packaging components. Resulting parts may have distortion defects due to thinning of pigment. Graphics may be susceptible to damage if they are on the surface of the thermoformed component. It has been found that locating a printed pigment deposit near the center of a thermoformable structure can help reduce the distortion and protect the pigment, resulting in a cost effective component with improved appearance. The advantages of the pigment placement are especially apparent for components formed with a draw ratio greater than 4.

It is an advantage of the some of the embodiments of thermoformable sheets described herein that they are produced by way of printing a relatively thin multilayer film. In this way, the production of the thermoformable sheet is more economical than methods or processes typically used for printing or pigmenting relatively thick sheet materials or thermoformed rigid packaging components.

Additionally, it is an advantage of the thermoformable sheets described herein that packaging components can be thermoformed, the thermoformed component displaying less pigment thinning and/or distortion than previously disclosed structures and methods. This advantage is particularly evident in deep draw applications with draw ratio greater than 4.

One embodiment of the thermoformable sheet has a structure of "thick"/"thin"/"thick" polymeric layers. A relatively thin multilayer film is printed such that a pigment deposit is formed on the surface of the multilayer film. As compared to printing on the surface of a rigid thermoformed sheet, printing on a thin film has processing advantages improving the cost and quality of the finished printed component.

After applying the pigment, the multilayer film is coated on both sides with a rigid component. The relatively thick first and second rigid components create the majority of the thickness of the rigid thermoformable sheet, providing enhanced thermoformability and protection for the multilayer film and the printed pigment deposit. It has been found that by providing thick layers on both sides of the printed multilayer film, the multilayer film and pigment can be more consistently thermoformed with a more even distribution of pigment material throughout the formed unit.

The completed thermoformable sheet can be formed into packaging units by means of vacuum thermoforming. The units can be used as packaging components in conjunction with other packaging components, such as heat sealable lidding. The thermoformed units have improved appearance when compared with previously known processes and structural design for producing pigmented or printed thermoformed units. The final units have less graphics distortion, less fading in thinned areas, less rub-off, etc. than previously known printed/pigmented units and are less expensive than label alternatives.

Figure 1A:
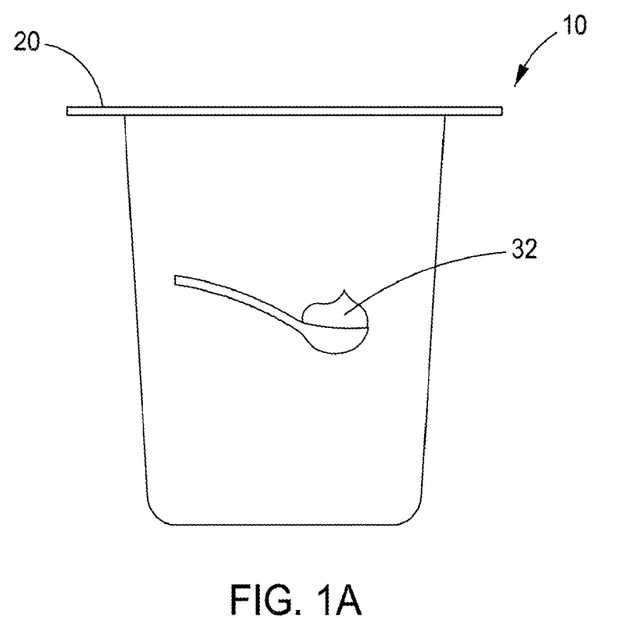
FIG. 1a is a side view of an embodiment of a thermoformed packaging unit.
Figure 1B:
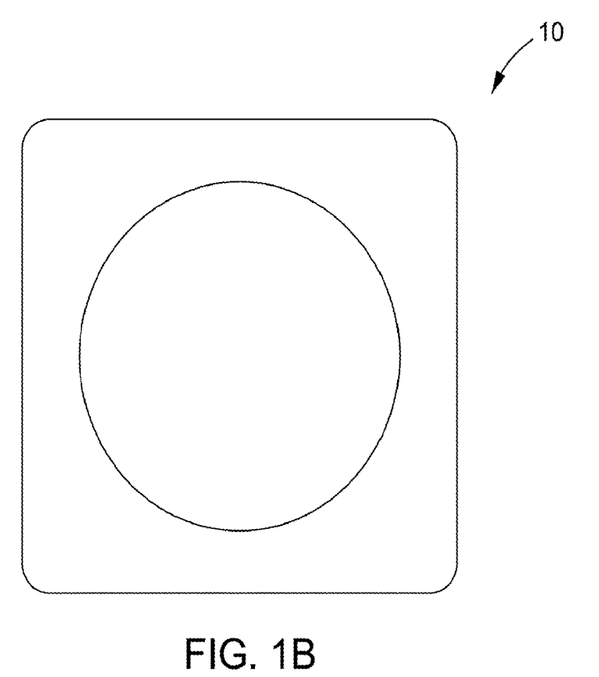
FIG. 1b is a top view of an embodiment of a thermoformed packaging unit.

Referring now to the drawings, FIG. 1a and FIG. 1b are a side view and top view, respectively, of an example of a thermoformed packaging unit 10 that could be produced from the thermoformable sheets 20 described herein. The cup shown is an example of a thermoformed packaging unit 10 that could be filled with a single serving of a food product, such as yogurt or pudding, and combined with a flexible lidding material to create a hermetically sealed package for retail distribution.

Figure 2:
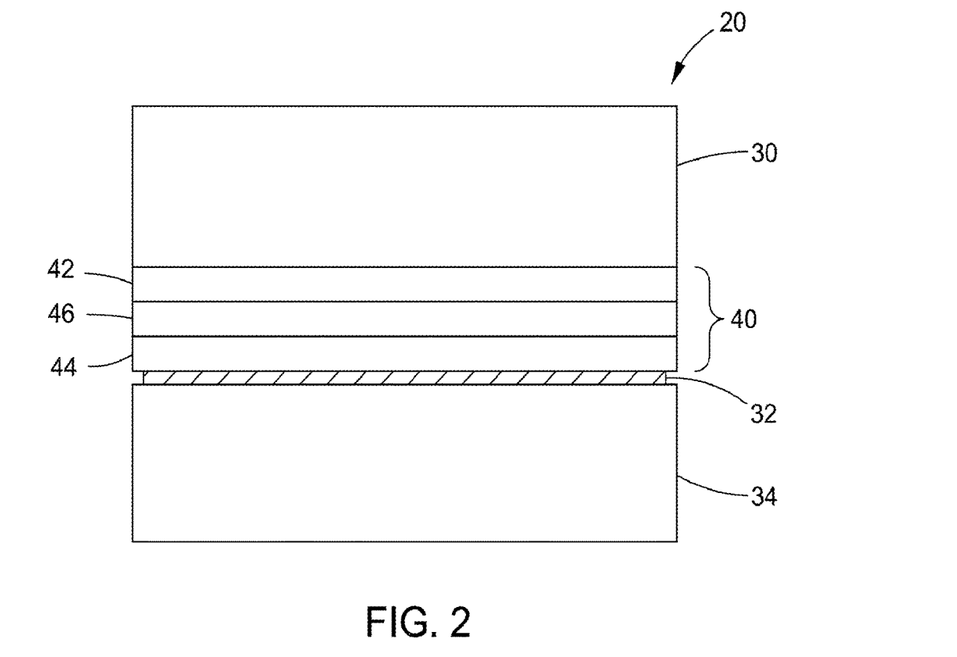
FIG. 2 is a cross-sectional view of an embodiment of a thermoformable sheet.

FIG. 2 is a cross-sectional representation of a general embodiment of a thermoformable sheet 20. A first and second rigid component, 30 and 34 respectively, are positioned on either side of multilayer film 40. The multilayer film has at least three layers: a first surface layer 42 adjacent to the first rigid component 30, a second surface layer 44 adjacent to the second rigid component 34 and an inner layer 46. Pigment 32 that has been deposited by a printing process is located between the second surface layer of the multilayer film 44 and the second rigid component 34.

Figure 3:
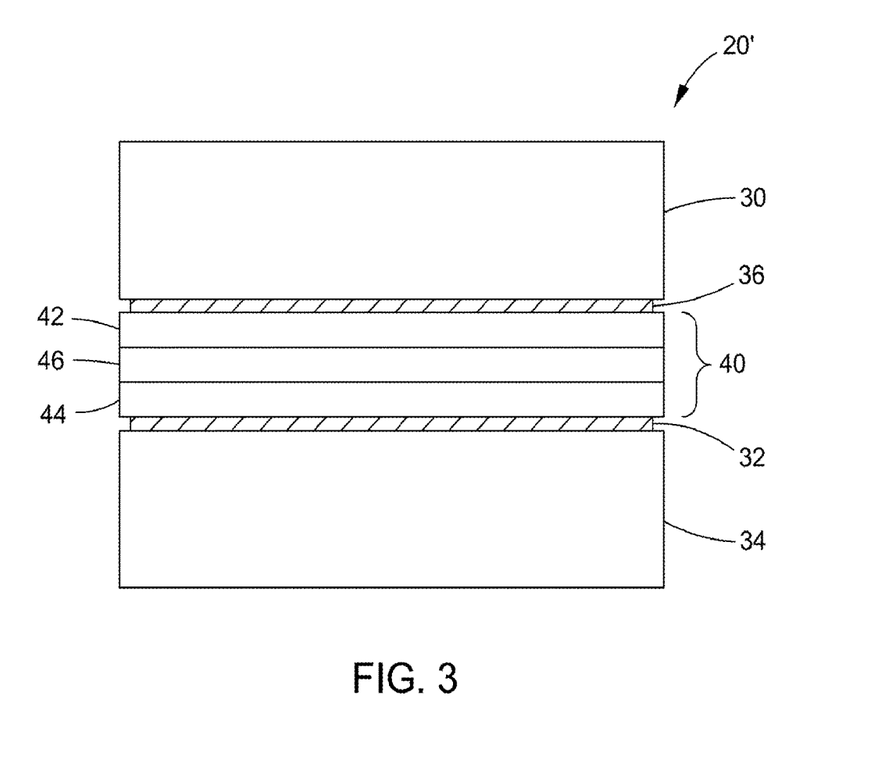
FIG. 3 is a cross-sectional view of an embodiment of a thermoformable sheet.

FIG. 3 is a cross-sectional representation of another embodiment of a rigid thermoformable sheet 20'. In this embodiment, the sheet comprises a second pigment deposit 36 located between the first surface layer of the multilayer film 42 and the first rigid component 30. This second deposit of pigment can provide a different appearance on either side of the sheet, or can further enhance the appearance provided by the first pigment deposit 32.

Figure 4:
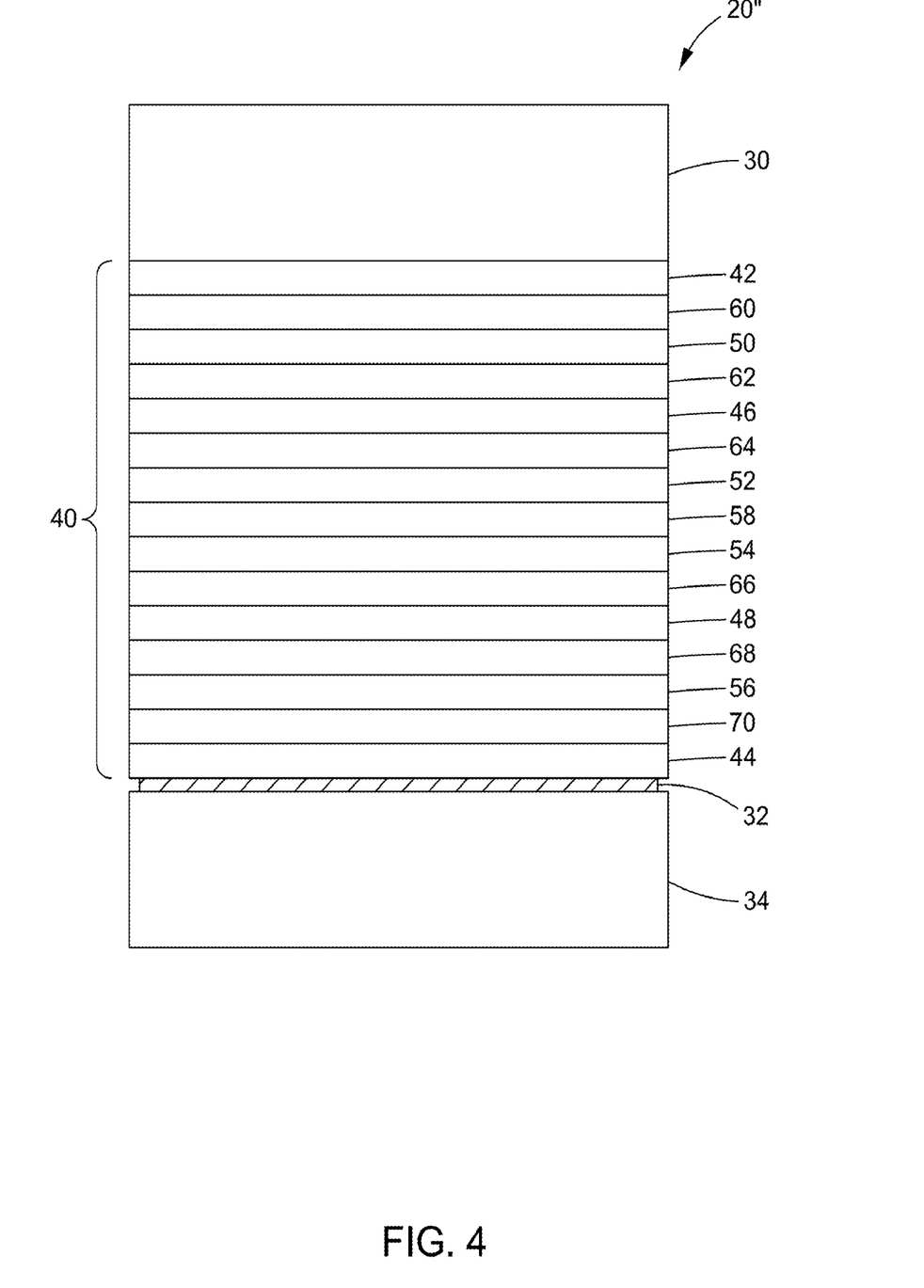
FIG. 4 is a cross-sectional view of an embodiment of a thermoformable sheet.

FIG. 4 is a cross-sectional representation of another embodiment of a rigid thermoformable sheet 20". In this embodiment, the multilayer film 40 has a first surface layer 42, a first bonding layer 60, a first layer comprising high density polyethylene (HDPE) 50, a second bonding layer 62, a first barrier layer comprising ethylene vinyl alcohol copolymer (EVOH) 46, a third bonding layer 64, a second layer comprising HDPE 52, a core layer 58, a third layer comprising HDPE 54, a fourth bonding layer 66, a second barrier layer comprising EVOH 48, a fifth bonding layer 68, a fourth layer comprising HDPE 56, a sixth bonding layer 70 and a second surface layer 44. Pigment 32 that has been deposited by a printing process is located between the second surface layer of the multilayer film 44 and the second rigid component 34. The first rigid component 30 is located adjacent to the first surface layer of the multilayer film 42.

Figure 5A:
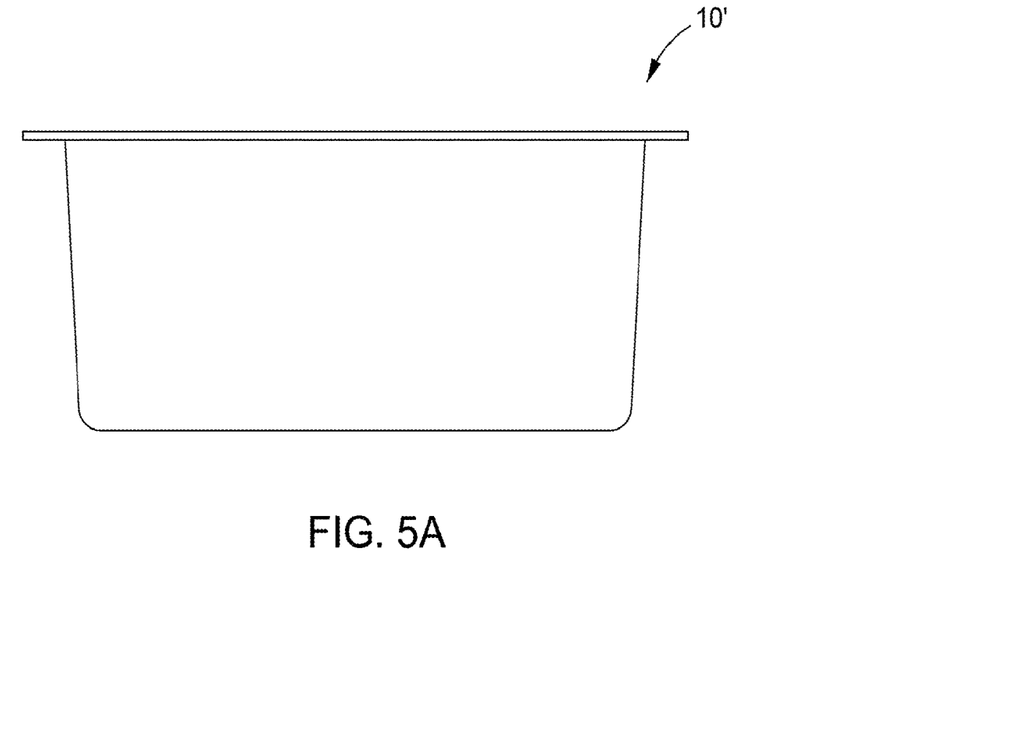
FIG. 5a is a side view of an embodiment of a thermoformed packaging unit.
Figure 5B:
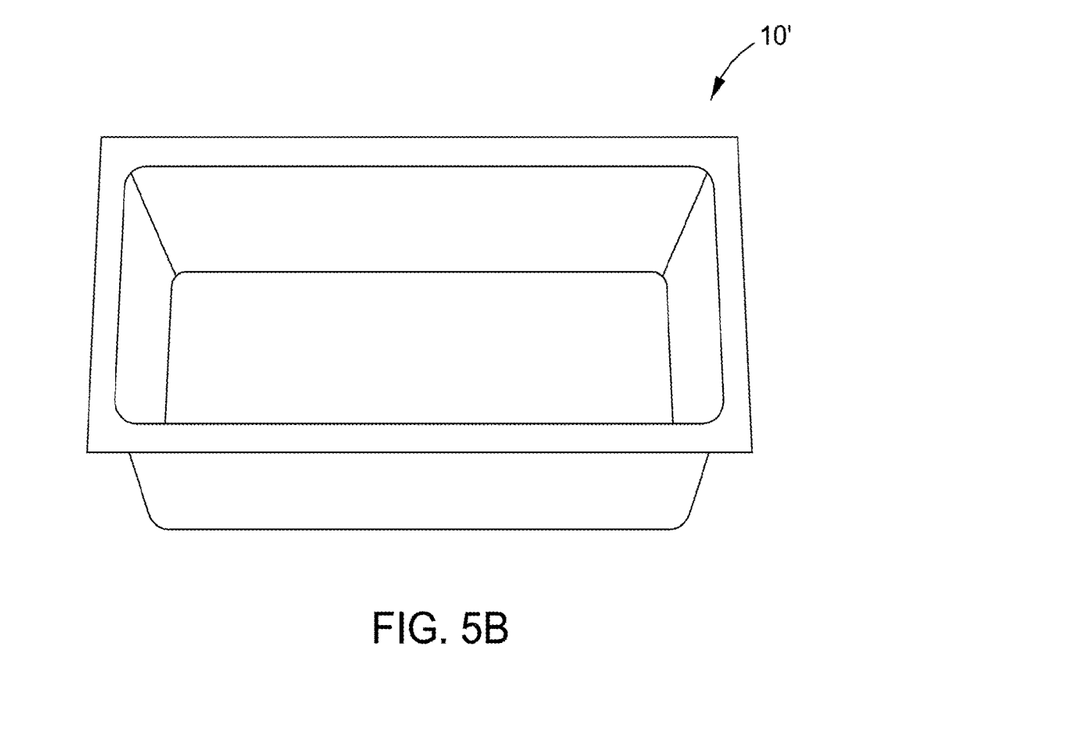
FIG. 5b is a top view of an embodiment of a thermoformed packaging unit.

FIGS. 5a and 5b are a side view and top view, respectively, of a second example of a thermoformed packaging unit 10' that could be produced from the thermoformable sheets described herein. Similarly, the unit shown could contain a product such as, but not restricted to, food, industrial or medical items and may be combined with another packaging component to create a hermetic package.

The center portion of the thermoformable sheet cased in the thermoformed packaging unit may comprise a multilayer film. As used throughout this application, the term "multilayer" refers to a single film structure, which may have one or a plurality of layers, generally in the form of a sheet or web which can be made from a polymeric material or a non-polymeric material bonded together by any conventional means known in the art (i.e., coextrusion, lamination, coating or a combination of such). As used throughout this application, the term "layer" refers to a discrete film or sheet component which is coextensive with the film or sheet and has a substantially uniform composition. In a monolayer film "film" "sheet" and "layer" would be synonymous.

The multilayer film includes as many layers as desired and, preferably, at least three layers. As used throughout this application, the term "inner layer" refers to a layer that is positioned between two other layers. As used throughout this application, the term "surface layer" refers to a layer that does not have another layer on at least one of the major surfaces, i.e. a surface layer is on the exterior of the multilayer film.

According to some embodiments, the thermoformable sheet contains a multilayer film with at least one inner layer. According to some embodiments, the thermoformable sheet contains a multilayer film with at least one barrier layer. As used throughout this this application, the term "barrier layer" refers to a layer that significantly reduces the transmission of molecular species through the layer. A barrier layer may be a surface layer or an inner layer of the multilayer film. A barrier layer may limit or reduce the permeation of migratory species such as moisture, oxygen or other gasses. Barrier layers are typically comprised of metals or polymers that are referred to as "barrier materials". Barrier materials useful for thermoformable sheets and thermoformed packaging units include, but are not limited to, ethylene vinyl alcohol copolymer, PVDC, high density polyethylene, cyclic olefin copolymers, polyamides, polyacrylates and metal oxides. Barrier layers may comprise blends of materials. The multilayer film may contain more than one barrier layer.

In some preferable embodiments of the thermoformable sheet, the multilayer film contains an inner layer that is a barrier layer comprising an ethylene vinyl alcohol copolymer. As used throughout this application, the term "ethylene vinyl alcohol copolymer" or "EVOH" refers to copolymers comprised of repeating units of ethylene and vinyl alcohol. Ethylene vinyl alcohol copolymers can be represented by the general formula: $[(CH_2—CH_2)_m—(CH_2—CH(OH))]_n$. Preferably, ethylene vinyl alcohol copolymers comprise from about 28 mole percent to about 48 mole percent ethylene. The type of EVOH may be selected to be one of the grades especially designed for thermoforming applications, as are known in the art. An example of a thermoformable EVOH is Soarnol™ ET3803 (38 mol % ethylene content) available from Soarus L.L.C. EVOH is known to reduce the permeation of oxygen and other gasses through polymeric based packaging films.

Other inner layers of the multilayer film may comprise any materials known to be compatible and useful to thermoformable packaging. Inner layers may be functional. For example, inner layers may provide barrier (barrier materials), adhesion (adhesive or tie materials), thermoforming stability, and any other functions known useful for multilayer films.

As used throughout this application, the term "tie material" refers to a polymeric material serving a primary purpose or function of adhering two surfaces to one another, presumably the planar surfaces of two film layers. A tie material adheres one film layer surface to another film layer surface. The tie material may comprise any polymer, copolymer or blend of polymers having a polar group or any other polymer, homopolymer, copolymer or blend of polymers, including modified and unmodified polymers (such as grafted copolymers), which provide sufficient interlayer adhesion to adjacent layers comprising otherwise nonadhering polymers.

Inner layers or surface layers of the multilayer film may provide oxygen barrier, as stated previously, or may provide other barrier such as moisture barrier. Some embodiments of the thermoformable sheet may include inner layers of the multilayer film that comprise high density polyethylene (HDPE) for moisture barrier improvements. The multilayer film may comprise one, two, three, four or more separate layers comprising HDPE. The multilayer film may comprise four separate inner layers, each consisting essentially of HDPE. That is, the HDPE may be accompanied by other minor components such as slip, antiblock, processing aid, nucleation additives, or hydrocarbon additives, such that the blend consists of at least 80% HDPE.

As used throughout this application, the term "polyethylene" or "PE" refers (unless indicated otherwise) to ethylene homopolymers as well as copolymers of ethylene with at least one alpha-olefin. The term will be used without regard to the presence or absence of substituent branch groups.

As used throughout this application, the term "high density polyethylene" or "HDPE" refers to both (a) homopolymers of ethylene which have densities from about 0.960 g/cm3 to about 0.970 g/cm3 and (b) copolymers of ethylene and an alpha-olefin (usually 1-butene or 1-hexene) which have densities from about 0.940 g/cm3 to about 0.958 g/cm3. HDPE includes polymers made with Ziegler or Phillips type catalysts and polymers made with single-site metallocene catalysts. HDPE also includes high molecular weight "polyethylenes." In contrast to HDPE, whose polymer chain has some branching, are "ultra high molecular weight polyethylenes," which are essentially unbranched specialty polymers having a much higher molecular weight than the high molecular weight HDPE.

The surface layers of the multilayer film may be of any polymeric material. In some embodiments, one or both surface layers of the multilayer film comprise styrenic polymers or polyolefins. The multilayer film surface layers may comprise an ethylene vinyl acetate copolymer. The surface layers of the multilayer film may be the same or different composition.

The multilayer film portion of the thermoformable sheet may be produced by any known means. Preferably, the multilayer film is a blown film. As used throughout this application, the term "blown film" refers to a film produced by the blown coextrusion process. In the blown coextrusion process, streams of melt-plastified polymers are forced through an annular die having a central mandrel to form a tubular extrudate. The tubular extrudate may be expanded to a desired wall thickness by a volume of fluid (e.g., air or other gas) entering the hollow interior of the extrudate via the mandrel, and then rapidly cooled or quenched by any of various methods known to those of skill in the art.

Optionally, the multilayer film may be produced as a blown film which is subsequently collapsed and bonded to inself. The material comprising the inner surface of the tubular extrudate may be chosen such that upon collapsing the tube, the film is combined into a single web. The material comprising the inner surface of the tubular extrudate becomes the core layer of the multilayer film. The material comprising the core layer of the multilayer film may be, but is not limited to, an ethylene vinyl acetate copolymer.

In preferred embodiments of the thermoformable sheet, the multilayer film serves as the film on which the pigment is deposited during the printing process. The pigment deposit may be directly adjacent to one or both surface layers of the multilayer film. In the case where the multilayer film serves as the printing substrate, it is desirable for the overall thickness of the multilayer film is less than about 5 mil. The thickness of the multilayer film should be between 1 mil and 5 mil such that it can be efficiently processed through a high speed press designed for flexible packaging webs. It has been found that the surface layers of the multilayer film that serve as the base for the pigment deposit may advantageously comprise styrenic copolymers or polyolefin based polymers. In some embodiments the polyolefin based polymer in the surface layer of the multilayer film is an ethylene vinyl acetate copolymer.

In some embodiments of the thermoformable sheet, a pigment deposit is located between the first and second rigid components. Ideally, the printed pigment is located relatively close to the center of the overall thermoformable sheet structure. The printed pigment may be deposited on the surface of the relatively thin multilayer film. The printed pigment may be directly adjacent to the second surface layer of the multilayer film.

The pigment can be deposited by any known process, such as flexographic, rotogravure or digital printing. The printing process may be one that is known as suitable for thin flexible webs, as is commonly known to the flexible packaging industry. The printing process may use an ink that contains the pigment and a carrier material, usually a polymer. The ink may also contain a solvent, such as water or ethyl acetate, which is removed by evaporation just after the pigment is deposited on the web. The printed pigment may be deposited by way of any ink system that is known to be useful for printing polymers, papers, nonwovens, metals or other materials common to flexible packaging.

The surface of the multilayer film may be modified prior to printing. Typically, the surface of the film to be printed is subjected to a process such as corona treatment to increase the surface energy and improve the printability of the film. Any treatment known to those skilled in the art may be used to modify the surface of the multilayer film prior to printing.

The printed pigment may be of more than one color. The printed pigment may be applied by more than one printing deck. Multiple colors may be applied to the thermoformable sheet such that they align to form a picture. The printed pigment may be applied in any pattern including, but not limited to solid layers, dots, and vignettes. The printed pigment may have a design or pattern. The printed pigment may be in the shape of indicia, such as letters or numbers.

Some embodiments of the thermoformable sheet may comprise pigment deposit in more than one location. The additional pigment deposits may or may not be located central to the structure. In one particular embodiment, the multilayer film has a printed deposit on both major surfaces, and the multilayer film is sandwiched between the rigid components (as shown in FIG. 3). In other embodiments, pigment deposits may be located elsewhere in the thermoformable sheet structure, including the exterior surfaces.

The pigment deposit has a rigid component located on both sides. In other words, the pigment deposit is sandwiched between a first and second rigid component. As used throughout this application, the term "rigid component" refers to a portion of the thermoformable sheet that has relatively high thickness and/or stiffness. The rigid components may be multilayer or monolayer. The rigid component may contain one or more layers containing polystyrene, polyester, polypropylene and blends of such. Examples include, but are not limited to, high impact polystyrene (HIPS), general purpose polystyrene (GPPS), styrene block copolymer (SBC) (including but not limited to styrene butadiene copolymer (SB)), polyethylene terephthalate (PET), amorphous polyethylene terephthalate (APET), glycol-modified polyethylene terephthalate (PETG) and blends of such. The composition and structure of the first and second rigid components may be the same or different.

The rigid components may also comprise other functional layers. The rigid components may comprise tie layers that may comprise tie materials. The rigid components may comprise barrier layers comprising barrier materials such as polyvinylidene chloride copolymer (PVdC) or ethylene vinyl alcohol copolymer (EVOH).

As used throughout this application, the term "polystyrene" or "PS" or "styrenic based polymers" refers to a homopolymer or copolymer having at least one styrene monomer linkage (such as benzene (i.e., $C_6H_5$) having an ethylene substituent) within the repeating backbone of the polymer. The styrene linkage can be represented by the general formula: $[CH_2-CH_2(C_6H_5)]_n$.

As used throughout this application, the term "polyester" refers to a homopolymer or copolymer having an ester linkage between monomer units which may be formed, for example, by condensation polymerization reactions between a dicarboxylic acid and a diol. The ester linkage can be represented by the general formula: $[O-R-OC(O)-R'-C(O)]_n$ where R and R' are the same or different alkyl (or aryl) group and may be generally formed from the polymerization of dicarboxylic acid and diol monomers containing both carboxylic acid and hydroxyl moieties. The dicarboxylic acid (including the carboxylic acid moieties) may be linear or aliphatic (e.g., lactic acid, oxalic acid, maleic acid, succinic acid, glutaric acid, adipic acid, pimelic acid, suberic acid, azelaic acid, sebacic acid, and the like) or may be aromatic or alkyl substituted aromatic (e.g., various isomers of phthalic acid, such as paraphthalic acid (or terephthalic acid), isophthalic acid and naphthalic acid). Specific examples of a useful diol include but are not limited to ethylene glycol, propylene glycol, trimethylene glycol, 1,4-butane diol, neopentyl glycol, cyclohexane diol and the like. Polyesters may include a homopolymer or copolymer of alkyl-aromatic esters including but not limited to polyethylene terephthalate (PET), amorphous polyethylene terephthalate (APET), crystalline polyethylene terephthalate (CPET), glycol-modified polyethylene terephthalate (PETG) and polybutylene terephthalate; a copolymer of terephthalate and isophthalate including but not limited to polyethylene terephthalate/isophthalate copolymer; a homopolymer or copolymer of aliphatic esters including but not limited to polylactic acid (PLA); polyhydroxyalkonates including but not limited to polyhydroxypropionate, poly(3-hydroxybutyrate) (PH3B), poly(3-hydroxyvalerate) (PH3V), poly(4-hydroxybutyrate) (PH4B), poly(4-hydroxyvalerate) (PH4V), poly(5-hydroxyvalerate) (PH5V), poly(6-hydroxydodecanoate) (PH6D); and blends of any of these materials.

As used throughout this application, the term "copolymer" refers to a polymer product obtained by the polymerization reaction or copolymerization of at least two monomer species. Copolymers may also be referred to as bipolymers. The term "copolymer" is also inclusive of the polymerization reaction of three, four or more monomer species having reaction products referred to terpolymers, quaterpolymers, etc.

As used throughout this application, the term "modified" refers to a chemical derivative, such as one having any form of anhydride functionality (e.g., anhydride of maleic acid, crotonic acid, citraconic acid, itaconic acid, fumaric acid, etc.), whether grafted onto a polymer, copolymerized with a polymer or blended with one or more polymers. The term is also inclusive of derivatives of such functionalities, such as acids, esters and metal salts derived from such.

As used throughout this application, the term "polypropylene" or "PP" refers to a homopolymer or copolymer having at least one propylene monomer linkage within the repeating backbone of the polymer. The propylene linkage can be represented by the general formula: $[CH_2-CH(CH_3)]_n$.

The rigid components may be located adjacent to the surface layers of the multilayer film, with only pigment deposits intervening. Optionally, adhesive components may also be located between first and second rigid components. Preferably, each of the two rigid components are directly attached to a surface layer of the multilayer film and/or the pigment deposit. Preferably, the pigment deposit is located directly adjacent to the second surface layer of the multilayer film and directly adjacent to the second rigid component. The first rigid component may be directly attached to the first surface layer of the multilayer film with or without an intervening second pigment deposit.

The rigid components may be transparent, translucent or opaque. The rigid components may also comprise pigments of any type within the polymer matrix (as opposed to printed pigment deposits).

In some embodiments, one or both of the first and second rigid components of the thermoformable sheet are also the exterior layers of the thermoformable sheet. In other words, the first rigid component may have a surface exposed to the environment and the second rigid component may have a surface exposed to the environment. Alternatively, either one or both of the first and second rigid components may have other materials on both of their exterior facing surfaces. For example, the surfaces of the rigid components may be partially or fully covered by printing inks, coatings, labels, polymeric materials, or other materials. These materials may be thick or thin and may be applied at any point of the manufacturing process, including after thermoforming.

Each of the first and second rigid components should be thick enough to contribute significant stiffness to the thermoformed packaging unit in the final form of a cup or tray. The required thickness of the rigid component may be dependent on the type of material used in the rigid component. For example, polyester copolymer or polystyrene based polymers may thermoform easily and evenly thus requiring less thickness to create an acceptable final part with stiffness appropriate for use. In general, the overall thickness of each rigid component should be greater than 6 mil, greater than 8 mil, greater than 10 mil or greater than 12 mil. In some embodiments the thickness of each rigid component is between 6 mil and 50 mil. In other embodiments the thickness of each rigid component is between 10 mil and 40 mil. The thickness of each rigid component may be between 12 mil and 30 mil. The first and second rigid components may be identical or different in structure, composition and thickness.

As stated previously, the printed pigment deposit should be located centrally to the thermoformable sheet structure. In this context, the term "centrally" is meant to indicate that the pigment is near the center of the structure, but not necessarily at exactly the center of the structure. In some cases, the ratio of the thickness of thermoformable sheet material on one side of the printed pigment deposit as compared to the thickness of thermoformable sheet material on the other side of the printed pigment deposit is 1:1, i.e. the pigment is in the center. Alternatively, the ratio of material thicknesses on either side of the printed pigment deposit may be 2:1. In some embodiments, the ratio of material thicknesses on either side of the printed pigment deposit may be less than 2:1, such as 1.9:1, 1.8:1, 1.7:1, 1.6:1, 1.5:1, 1.4:1, 1.3:1, 1.2:1 or 1.1:1.

Ideally, the thickness of each rigid component is nearly the same. The ratio of the thickness of the first rigid component to the thickness of the second rigid component may be between 2:1 and 1:2. In some embodiments the ratio of the thicknesses of the rigid components is 1:1.

The rigid components can be manufactured in any way known for producing these materials. The rigid layers of polymer can be extruded, using coextrusion if the rigid component is multilayer. Alternatively, each layer of the rigid component can be independently produced and then attached at a later point. The rigid component can be attached to other materials, such as the pigment or the multilayer film, by way of adhesive lamination, thermal lamination, or extrusion lamination.

The thermoformable sheets described herein are used to produce thermoformed packaging units such as cups or trays. As used throughout this application, the term "thermoformed" refers to a primarily polymer film or sheet permanently formed into a desired shape by the application of a differential pressure between the sheet and a mold, by the application of heat, by the combination of heat and the application of a differential pressure between the film or sheet and a mold, or by any thermoforming technique known to those skilled in the art. Thermoformed units may have one or more compartments and may take a wide variety of shapes and designs. The thermoformable sheet may be formed with the first rigid component oriented closer to the interior of the thermoformed unit, relative to the second rigid component. Or, vice versa, the thermoformable sheet may be formed with the second rigid component oriented closer to the interior of the thermoformed unit, relative to the first rigid component.

These thermoformed packaging units may be combined with other packaging components to produce hermetic packaging for a wide variety of products, including but not limited to food, pharmaceuticals, medical devices, consumer goods, industrial goods, liquids, solids, and mixtures. The thermoformed packaging units may be combined with other packaging components in a variety of ways including, but not limited to, heat sealed to a lidding material, glued to a paperboard backing or radio frequency welded to a second thermoformed unit. The thermoformed packaging units may be combined with other packaging components to hermetically seal the product within.

The advantages of the printed thermoformable sheet described herein is most noted when thermoformed into a shape that has a draw ratio greater than 4. The advantages of the structures described herein are most evident in thermoformed packaging units that have a draw ratio between 4 and 7. Draw ratio is the ratio of the surface area of the thermoformed unit to the surface are of the thermoformable sheet prior to forming. The larger the extent of forming, the higher the draw ratio. For example, a cup of 100 mm diameter that is drawn to a depth of 10 mm has a draw ratio of about $1.4(((2\pi r \times h)+(\pi r^2))/(\pi r^2))$. A cup of 100 mm diameter that is drawn to a depth of 100 mm has a draw ratio of about 5.

As a thermoformable sheet is drawn into deeper depths, the material is stretched thinner to cover the expanding surface area. The thermoforming conditions (heat, vacuum timing, plug assist, etc.) and material selection can determine how evenly the material thins throughout the thermoformed part. Typically, the ideal state is that the thermoformable sheet has thinned evenly throughout the part. However, practically, areas such as corners or sidewalls are thinner than other areas, such as the bottom. If the thermoformable sheet contains multiple layers, each layer may or may not thin in a relatively consistent manner as compared to other layers. The relative thinning of a material during thermoforming is dependent on many things, including the material it comprises, the thermoforming conditions, and the location of the material relative to the entire structure.

The thinning characteristics are especially important for pigments as this can cause visual defects for the thermoformed packaging unit. One method for limiting the visual defects of a thermoformed part is to impart the pigment into one of the polymeric layers. The limited distortion is due to the high pigment content and the broad distribution through at least part of the thickness of the sheet. However, using this technique has limitations of higher cost (more pigment is required), limited manufacturing flexibility and limited design options. To overcome these drawbacks, pigmenting by way of printing is desired.

It has been found that printed pigment deposits exhibit less thinning when positioned near the center of the thermoformable sheet structure as described herein. Without limiting the disclosure, it is theorized that the pigment layer experiences more even stress from either side, since the two sides are relatively similar. The even stress from either side allows the pigment itself to more evenly thin upon thermoforming. This is relative to pigment layers that may be located at or near the surface of a structure to be thermoformed.

To enable location of the printed pigment deposit near the center of the thermoformable sheet, it has been found that a structure containing a relatively thin multilayer film near the center of the sheet may be advantageous. The printed pigment deposit can be cost effectively and efficiently placed on the multilayer film, and the film subsequently covered on both sides by a relatively thick rigid component.

The pigment deposit in the thermoformed packaging unit may be visible from the exterior of the unit, such that it can be seen after a product is placed inside and the package is sealed. The pigment deposit may also be visible from the inside of the thermoformed packaging unit. While the thermoformed packaging unit may be opaque overall, at least the portion of the thermoformable sheet that is between the pigment and the "visible side" of the unit should be at least partially transparent, such that the pigment can be seen. It may be advantageous to add pigment to some layers of the thermoformable sheet (the multilayer film, one of the rigid components, or some other portion), such that it provides an overall background to the printed pigment deposit.

EXAMPLES

Three exemplary thermoformable packaging sheets were produced via a multi-step conversion process. First, a multilayer coextruded film was produced using a standard blown film process, as is known to those skilled in the art. During this process, the film was collapsed and thermally laminated to itself at the inner layers of the annular extrusion such that the structure of the completed film was palindromic. The resulting film was approximately 3.5 mil (88.9 micron) and had relatively low haze. The multilayer film was then printed using a flexographic printing process and solvent based inks that are standard for flexible packaging applications. For Example 1, the ink was printed in a grid style pattern and for Examples 2 and 3 the ink was deposited to cover 100% of one side of the film. Once applied, the ink was dried in an oven to remove any solvent before rewinding the printed film. Finally, the printed film was then extrusion coated on both sides, resulting in the structures outlined in Table 1.

TABLE 1

Exemplary Thermoformable Packaging Sheet Structures

| Example 1 | Example 2 | Example 3 | Layer Description |
|---|---|---|---|
| First Rigid Component 15.75 mil (400 micron) | First Rigid Component 25 mil (635 micron) | First Rigid Component 26.75 (679.5 micron) | Polyethylene Polymeric tie PETG Polymeric tie Polystyrene based blend |
| Multilayer Coextrusion 3.5 mil (88.9 micron) | Multilayer Coextrusion 3.5 mil (88.9 micron) | Multilayer Coextrusion 3.5 mil (88.9 micron) | Polystyrene based blend Polymeric tie HDPE Polymeric tie EVOH Polymeric tie HDPE EVA HDPE Polymeric tie EVOH Polymeric tie HDPE Polymeric tie Polystyrene based blend |
| Pigment Deposit, Grid Pattern | Pigment Deposit, 100% color coverage | Pigment Deposit, 100% color coverage | |
| Second Rigid Component 18.75 mil (476.25 micron) | Second Rigid Component 29.5 mil (749.3 micron) | Second Rigid Component 31.75 mil (806.5 micron) | Polystyrene blend |

The thermoformable packaging sheet of Example 1 was formed into a cup shaped mold such that the first rigid component was oriented to the interior of the cup. The cup had a square shaped bottom, of approximately 54 mm width and 54 mm length. The cup was drawn to a depth of approximately 54 mm. The forming mold had a draw ratio of approximately 5. The printed grid of the formed part was only minimally faded and distorted as compared to the flat sheet. The thermoformable packaging sheets of Example 2 and 3 were formed into a cup shaped mold having a draw ratio of approximately 4.8 (cup with a round bottom of diameter 44 mm and depth 42 mm, approximately). The color was only minimally faded and distorted as compared to the flat sheet.

Prophetic Example

A structure could be made using a similar process as outlined in Examples 1-3, but with the structure as outlined in Table 2.

TABLE 2

| Prophetic Packaging Sheet Structure | |
|---|---|
| Example | Layer Description |
| First Rigid Component 8.95 mil (227.3 micron) | White HIPS blend |
| Multilayer Coextrusion 3.5 mil (88.9 micron) | Polystyrene based blend Polymeric tie EVOH Polymeric tie HDPE EVA HDPE Polymeric tie EVOH Polymeric tie Polystyrene based blend |
| Pigment Deposit, 100% color coverage | |
| Second Rigid Component 8.95 mil (227.3 micron) | Polystyrene blend |

White HIPS blend is high impact polystyrene and TiO2.

Embodiments

A. A thermoformable sheet comprising
 a) a first rigid component comprising a first styrenic polymer;
 b) a multilayer film comprising
  i) a first surface layer adjacent to the first rigid component;
  ii) a barrier layer comprising ethylene vinyl alcohol copolymer; and
  iii) a second surface layer;
 c) a printed pigment deposit directly adjacent to the second surface layer of the multilayer film; and
 d) a second rigid component comprising a second styrenic polymer, the second rigid component directly adjacent to the printed pigment deposit.
B. A thermoformable sheet according to embodiment A wherein both the first and second rigid component are each greater than 6 mil (152.4μ) thickness.
C. A thermoformable sheet according to any previous embodiment wherein the printed pigment deposit extends over essentially the entire second surface layer of the multilayer film,
D. A thermoformable sheet according to any previous embodiment wherein the sheet is opaque.
E. A thermoformable sheet according to any previous embodiment wherein either the first or second rigid component further comprises a pigment.
F. A thermoformable packaging sheet according to any previous embodiment wherein the multilayer film further comprises:
 a) a second barrier layer comprising ethylene vinyl alcohol copolymer, and
 b) four inner layers each comprising high density polyethylene.
G. A thermoformed packaging unit comprising a thermoformable sheet according to any of embodiments A-F, wherein the draw ratio is greater than 4.
H. A thermoformed packaging unit comprising a thermoformable sheet comprising:
 a) a first rigid component with a thickness of at least 6 mil (152.4μ);
 b) a second rigid component with a thickness of at least 6 mil (152.4μ); and
 c) a printed pigment deposit located between the first and second rigid components;
 d) wherein the packaging unit has a draw ratio greater than 4.
I. A thermoformed packaging unit comprising a thermoformable sheet comprising:
 a) a multilayer film comprising
  i) a first surface layer,
  ii) a second surface layer, and
  iii) a first barrier layer;
 b) a printed pigment deposit located directly adjacent to the second surface layer of the multilayer film;
 c) a first rigid component with a thickness of at least 6 mil (152.4μ);
 d) a second rigid component with a thickness of at least 6 mil (152.4μ);
 e) wherein the multilayer film is located between the first and second rigid components and the packaging unit has a draw ratio greater than 4.
J. A thermoformed packaging unit according to embodiments G, H or I having a draw ratio between 4 and 7.
K. A thermoformed packaging unit according to any of embodiments I or J wherein the multilayer film further comprises a second barrier layer separated from the first barrier layer.
L. A thermoformed packaging unit according to any of embodiments I through K, comprising a second printed pigment deposit adjacent to the first surface layer of the multilayer film.
M. A thermoformed packaging unit according to any of embodiments I through L wherein the multilayer film has a thickness less than 5 mil (127μ).
N. A thermoformed packaging unit according to any of embodiments I through L wherein the multilayer film has a thickness from 1 mil (25.4μ) to 5 mil (127μ).
O. A thermoformed packaging unit according to any of embodiments I through N wherein the second surface layer of the multilayer film comprises a polyolefin.
P. A thermoformed packaging unit according to embodiment O wherein the polyolefin is an ethylene vinyl acetate copolymer.

Q. A thermoformed packaging unit according to any of embodiments G through P wherein the first rigid component comprises polystyrene, polyester, polypropylene, or blends thereof and the second rigid component comprises polystyrene, polyester, polypropylene or blends thereof.

R. A thermoformed packaging unit according to any of embodiments G through Q wherein both the first and second rigid component have a thickness from 10 mil (254μ) to 40 mil (1016μ).

S. A thermoformed packaging unit according to any of embodiments G through R having a ratio of the thickness of the first rigid component to the thickness of the second rigid component between 1:2 and 2:1.

T. A thermoformed packaging unit according to any other embodiment wherein the thermoformable sheet thickness is greater than 35 mil (889μ).

What is claimed is:

1. A thermoformed packaging unit comprising a thermoformable sheet comprising:
   a) a multilayer film comprising
      i) a first surface layer,
      ii) a second surface layer, the second surface layer comprising an ethylene vinyl acetate copolymer, and
      iii) a first barrier layer;
   b) a printed pigment deposit located directly adjacent to the second surface layer of the multilayer film;
   c) a first rigid component with a thickness of at least 6 mil (152.4μ);
   d) a second rigid component with a thickness of at least 6 mil (152.4μ);
   e) wherein the multilayer film is located between the first and second rigid components and the packaging unit has a draw ratio greater than 4.

2. A thermoformed packaging unit according to claim 1 wherein the multilayer film further comprises a second barrier layer separated from the first barrier layer.

3. A thermoformed packaging unit according to claim 1, comprising a second printed pigment deposit adjacent to the first surface layer of the multilayer film.

4. A thermoformed packaging unit according to claim 1 wherein the multilayer film has a thickness less than 5 mil (127μ).

5. A thermoformed packaging unit according to claim 1 wherein the multilayer film has a thickness from 1 mil (25.4μ) to 5 mil (127μ).

6. A thermoformed packaging unit according to claim 1 wherein the first rigid component comprises polystyrene, polyester, polypropylene, or blends thereof and the second rigid component comprises polystyrene, polyester, polypropylene or blends thereof.

7. A thermoformed packaging unit according to claim 1 wherein both the first and second rigid component have a thickness from 10 mil (254μ) to 40 mil (1016μ).

8. A thermoformed packaging unit according to claim 1 having a ratio of the thickness of the first rigid component to the thickness of the second rigid component between 1:2 and 2:1.

9. A thermoformed packaging unit according to claim 1 wherein the thermoformable sheet thickness is greater than 35 mil (889μ).

10. A thermoformable sheet comprising
   a) a first rigid component comprising a first styrenic polymer;
   b) a multilayer film comprising
      i) a first surface layer adjacent to the first rigid component;
      ii) a barrier layer comprising ethylene vinyl alcohol copolymer; and
      iii) a second surface layer;
   c) a printed pigment deposit directly adjacent to the second surface layer of the multilayer film; and
   d) a second rigid component comprising a second styrenic polymer, the second rigid component directly adjacent to the printed pigment deposit.

11. A thermoformable sheet according to claim 10 wherein both the first and second rigid component are each greater than 6 mil (152.4μ) thickness.

12. A thermoformable sheet according to claim 10 wherein the printed pigment deposit extends over essentially the entire second surface layer of the multilayer film.

13. A thermoformable sheet according to claim 10 wherein the sheet is opaque.

14. A thermoformable sheet according to claim 10 wherein either the first or second rigid component further comprises a pigment.

15. A thermoformable packaging sheet according to claim 10 wherein the multilayer film further comprises:
   a) a second barrier layer comprising ethylene vinyl alcohol copolymer, and
   b) four inner layers each comprising high density polyethylene.

16. A thermoformed packaging unit comprising a thermoformable sheet according to claim 10, wherein the draw ratio is greater than 4.

17. A thermoformed packaging unit according to claim 1 having a draw ratio between 4 and 7.

* * * * *